United States Patent [19]

Alcaide et al.

[11] 4,008,619
[45] Feb. 22, 1977

[54] VACUUM MONITORING

[75] Inventors: H. David Alcaide, Bedford; James H. Ewing, Brockton, both of Mass.

[73] Assignee: MKS Instruments, Inc., Burlington, Mass.

[22] Filed: Nov. 17, 1975

[21] Appl. No.: 632,460

[52] U.S. Cl. .................. 73/398 C; 23/232 E; 23/254 E; 29/593; 340/236; 427/10; 427/109; 427/123

[51] Int. Cl.² .................. G01L 9/12; G01N 27/04

[58] Field of Search .......... 23/232 E, 254 E, 255 E; 427/10, 109, 123; 73/398 R, 398 C, 398 AR; 29/593, 620; 324/65 R, 65 US; 340/237 R, 237 US; 338/13 US; 317/24 G, 24 US

[56] References Cited
UNITED STATES PATENTS

| | | | |
|---|---|---|---|
| 2,533,339 | 12/1950 | Willenborg | 23/255 E X |
| 3,012,432 | 12/1961 | Moore et al. | 73/398 AR X |
| 3,232,712 | 2/1966 | Stearns | 23/255 E |
| 3,374,112 | 3/1968 | Danon | 427/10 |
| 3,924,219 | 12/1975 | Braun | 23/255 E X |

Primary Examiner—Joseph Scovronek
Attorney, Agent, or Firm—James E. Mrose

[57] ABSTRACT

Monitoring of gas contamination and of related deviations in pressures within a sealed cavity is effected by way of electrical-network responses to conduction characteristics of a thin-film deposit of getter material within the cavity, the getter film being deposited upon inert insulation between conductive contacts externally connected into an electrical circuit which controls related output signalling in accordance with conductance changes caused by getter material reactions with gas within the cavity.

16 Claims, 4 Drawing Figures

U.S. Patent  Feb. 22, 1977  4,008,619
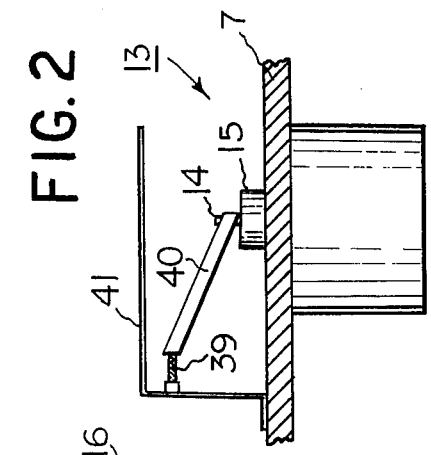
FIG. 2
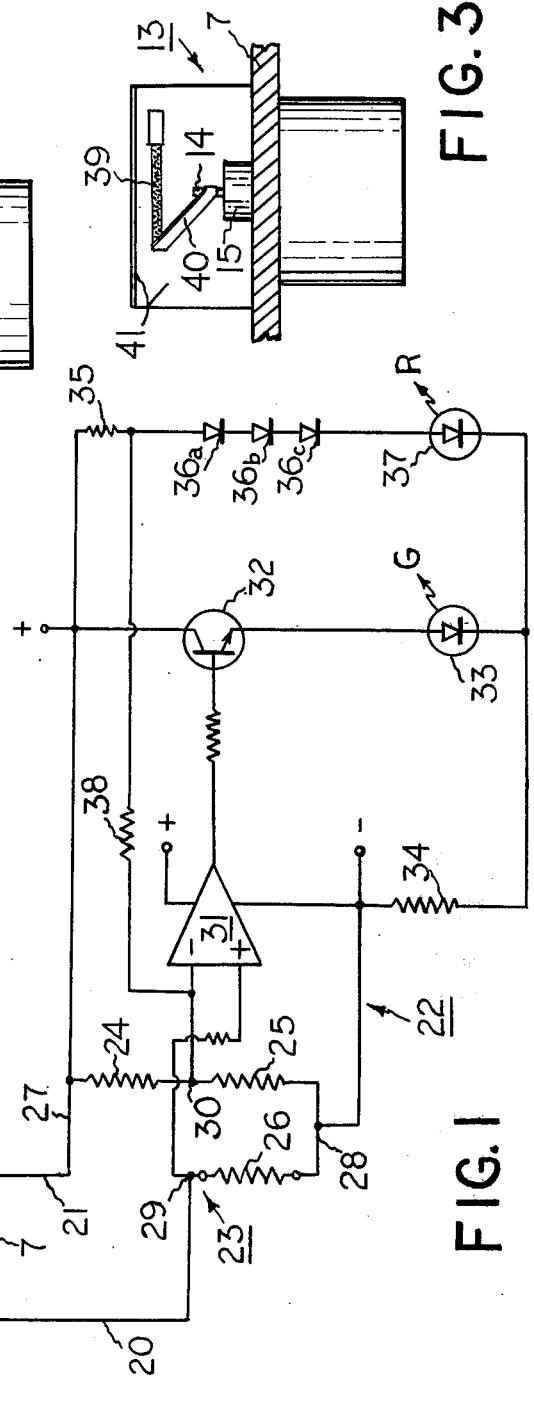
FIG. 3
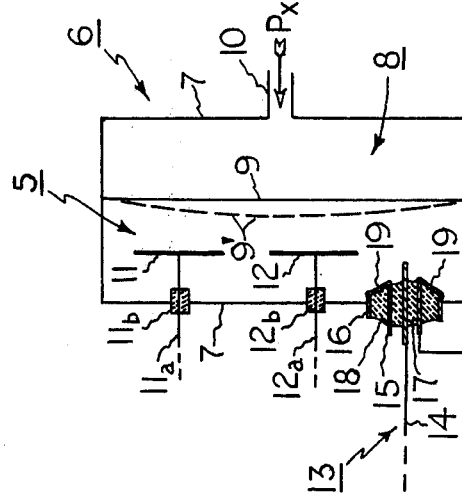
FIG. 4
FIG. 1

VACUUM MONITORING

BACKGROUND OF THE INVENTION

The present invention relates to improvements in the measurement and indication of influences of gases within a sealed cavity such as one which is evacuated and is intended to sustain a relatively hard vacuum, and, in one particular aspect, to unique and improved vacuum-monitoring processes and equipment involving a thin-film deposit of a getter material, such as barium, insulatedly supported within an evacuated cavity and exhibiting its electrical resistance to external detection and signalling circuitry which responds thereto and to its changes induced by reactions with unwanted gas, whereby contamination and depletion of desired vacuum conditions are monitored indirectly.

Uses of so-called "getters" has long been commonplace in connection with incandescent lamps and electronic vacuum tubes, wherein high-vacuum and contamination problems have been alleviated somewhat by their removal of residual gas and, in the case of so-called "keepers", by their further combination with gas subsequently liberated. Among the materials which combine readily with gases, and have desirable gettering properties, are barium, magnesium, zirconium, red phosphorous, aluminum and cerium, and tantalum and zirconium have outstanding capacity of absorb gases when raised to high temperatures. It has also been known to hold a low pressure in other enclosures, such as the reference-pressure cavity of a differential-pressure device, by means of a getter pump which tends to effect the error-inducing consequences of outgassing or leakage into that cavity. For such purposes, a clean surface of highly reactive getter material, such as barium, is vapor-deposited with the aid of resistance or induction heating within the cavity before or after it is sealed off. Thereafter, however, the extent to which the reference cavity may have lost its useful vacuum, despite initial presence of a deposited getter layer, cannot be determined by the user, and the pressure sensing may in fact involve significant error.

In accordance with certain aspects of the present teachings, the resistance changes in a deposited layer of barium getter or the like are sensed externally of an evacuated cavity, and implementation of that practice calls for the barium layer to be in good electrical contact with sealed feedthrough terminals and to be essentially insulated from other parts whose resistance might tend to by-pass and render uncertain the sensing of resistance of getter layer material between those terminals. Control of the deposit of the getter layer is thus quite important, and, to that end, a preferred deposition practice akin to that used with metal-envelope vacuum tubes is adapted to a localized and directionalized application of the layer to critical surface areas; specifically, a suitably-coated metal ribbon, such as one of barium-coated tantalum or the like, with mechanical shielding disposed nearby, is heated by an electrical current and resulting barium vapor from its coating is directed to those surface areas.

SUMMARY OF THE INVENTION

The present invention is aimed at creating an improved method and apparatus for monitoring the gas conditions and related vacuum status of an evacuated cavity, without impairing existing seals and without altering the calibration or condition of vacuum due to the monitoring activity. In a preferred embodiment, that of an absolute pressure sensor of the type including a diaphragm disposed between a zero-pressure reference cavity and a measurement cavity exposed to variable pressures which are to be sensed, so-called "outgassing" of gases from material in or bordering the reference cavity and minute leakages from outside are especially troublesome in that they will cause the vacuum there to lose its important reference value and will in turn occasion error in the measurements being referenced to that vacuum. Introduction of a simple getter "pump", such as the aforementioned highly-reactive clean surface of barium or the like, serves to hold reference-cavity pressure at the needed low level for a long period of time, as a consequence of the getter affinity for and combination with certain of the liberated gases. Once the getter material is no longer capable of combining effectively with outgassed or leaked gases, the loss of intended reference-vacuum conditions may not be discernible by the user and the accompanying measurement error (i.e. erroneously low reading of pressure) can render the device seriously inaccurate; unfortunately, the times when precision has been lost for such reasons are not at all predictable, because of different conditions of use and because of unavoidable physical differences even in seemingly-identical devices. Uniquely, this invention recognizes and exploits the facts that getter material such as barium is not protected, by its own oxide for example, which results from its combination with gases, and that the progressive reactions change progressively larger amounts of the highly-conductive getter material into substantially non-conductive compounds, and that the effective resistance exhibited across a given span of a layer of the getter material thus increases substantially in proportion to the thickness thereof which remains unreacted. Implementing structure may involve a combined electrical connector and sensing unit, sealed with the reference cavity and affording a pair of externally-accessible electrical connections with an internally-deposited getter layer which has been flashed locally onto insulating and contact surfaces of the unit, for example by way of a shielded coated heater ribbon electrically energized through the same connector unit. Resistance exhibited between the contacts by the barium layer is coupled externally into an electrical circuit, through the connector unit, and in one implementation causes a bridge to control an associated electrical signalling network whose outputs will excite emissions by a first light-emitting-diode (LED) when the resistance is of a low value characteristic of low pressures and high vacuum conditions which should exist when a sensor is relatively new and of optimum quality, and whose outputs later also will jointly excite that and a second LED into emission when the resistance increases to a near-critical level characterizing an impending failure of the device to sustain a desired reference-vacuum condition, and whose outputs will ultimately excite emissions only from the second LED when the layer resistance is very high and the reference-vacuum condition is likely to be unreliable for the making of precision measurements. Alternatively, some function of the resistance may be continuously monitored for end-of-life predictions, to initiate alarms, shut down processes or the like.

Accordingly, it is one of the objects of the present invention to provide novel and improved practices and apparatus for indirect electrical monitoring of gas contamination at a site exhibiting very low-pressure or substantially vacuum conditions.

Another object is to provide unique electrical gas-monitoring equipment which may be sealed with an evacuated cavity to generate a deposit of getter material extending between electrical contacts along an isolated path where it presents measurable variations in resistance upon reaction with gas.

A further object is to provide electrical vacuum-monitoring apparatus in which resistance of a highly-reactive layer of getter material within the reference cavity of an absolute pressure sensor or the like controls a network in exciting relationship to indicators of the status and predictable change in status of the cavity pressure.

BRIEF DESCRIPTION OF THE DRAWINGS

Although the aspects of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 provides a partly pictorial and schematic representation of an absolute-pressure sensor in association with the improved electrical monitoring unit and electrical signalling network;

FIG. 2 illustrates a monitoring connector unit, such as that represented in the FIG. 1 system, together with vaporizing and shielding provisions, in a side view;

FIG. 3 provides another view of the unit of FIG. 2, taken from the right in FIG. 2; and FIG. 4 is a plan view of the unit shown in FIGS. 2 and 3.

DETAILED DESCRIPTION OF THE PREFERRED EMBODIMENTS

Having reference to the drawings, wherein like reference characters designate identical or corresponding components and units throughout the several views, and, more particularly, to FIG. 1 thereof, one embodiment of a unique system for the indirect monitoring of gas pressure by electrical means is shown to be associated with the reference cavity 5 of an absolute pressure sensor 6. That sensor is in general of a well-known type wherein the rigid and impervious walls 7 enclose and seal not only the reference cavity 5 but also a measurement cavity 8, the two being separated by a tensioned metal diaphragm 9 which may deflect substantially in proportion to the differences between a measured pressure, Px, admitted to cavity 8 by way of a suitable inlet 10, and a reference pressure maintained within reference cavity 5. The latter pressure may be substantially zero, for example, as the result of a scrupulous evacuation process employed in manufacture of the device, and the diaphragm deflections, characterized by dashed linework 9', will enable related capacitance conditions to be measured via fixed electrodes 11 and 12. Both of these electrodes have their feedthrough connectors, 11 a and 12 a, sealed with and insulated from the walls 7 by glass-to-metal seals 11 b and 12 b or the like, and they are coupled into associated electronic equipment of known form (not shown) which senses related capacitance variations occasioned by the diaphragm deflections. Such equipment affords precise measurements of the pressure Px, provided the reference-cavity pressure is a constant, but, inherently, error can result from the build-up of gas pressure within the reference cavity due to such disturbances as leakage or outgassing from the materials of construction. Presence of an unreacted quantity of highly-reactive getter material within the reference cavity tends to hold the high vacuum for a relatively long period of time, inasmuch as certain of such materials, and notably barium, have a great affinity for nearly all gaseous molecules and react with them to form compounds which have very low vapor pressures. For optimum effectiveness, the barium or equivalent getter material is preferably introduced in a substantially clean unreacted metallic form near or subsequent to the time when evacuation takes place, and the material is spread over a broad area to afford a large exposure to gas molecules with which it may react. In practice, these characteristics are conveniently developed through vapor deposition of the material, yielding a thin film or layer which in time unfortunately loses its capability of reacting adequately with further gases, and, at some time which is not predictable because of variables such as differing porosities, leaks, and outgassing propensities, the reference-cavity pressure may be expected to rise and thereby disturb the accuracy of the measurements predicated upon supposed constancy of reference-pressure.

With the objectives of detecting whether the low reference-pressure is being sustained, and of warning of impending loss of reliable reference-pressure conditions, a combined flasher and sensor unit 13 is provided. In one embodiment that unit employs certain of the features of an electrical coaxial connector, in that it has a central conductor 14 and a surrounding pair of hollow cylindrical conductors 15 and 16, all of which are sealed integrally with one another but are also electrically insulated from one another by way of annular glass or equivalent spacers 17 and 18. Outer concentric conductor 16 is shown (FIG. 1) to be sealed in turn with the cavity wall 7, such that the entire unit 13 exposes its inner surfaces to the cavity volume 5 while at the same time affording isolated electrical connections 14, 15 and 16 which are accessible externally. The portion of wall 7 in which unit 13 and electrodes 11 and 12 are mounted may conveniently comprise a cover plate for the reference cavity, such that these items and further shields and vapor-deposition accessories (FIGS. 2–4) may readily be assembled with it prior to final sealing of that cover plate with the balance of the pressure sensor structure. Once the mechanical assembly has been completed, a thin layer of barium, 19, is flashed onto at least certain of the surfaces of unit 13, within cavity 5, utilizing provisions described later herein with reference to FIGS. 2–4. That barium layer makes good electrical contact with the tubular conductor 15 of unit 13, as well as with its outer conductor 16 and/or walls 7, and overlies the inner exposed insulating surfaces of glass separator 18 between conductors 15 and 16. Accordingly, the electrical resistance exhibited by the layer 19 between the sites of conductors 15 and 16 is separately measurable, and leads 20 and 21 provide a coupling of that resistance into associated electrical sensing and signalling equipment 22.

The barium layer resistance, as developed initially, may typically prove to be from about 5 to 1,000 ohms, and in one embodiment is introduced as one of the arms of a conventional four-arm bridge circuit 23, the remaining arms consisting of the resistances 24 and 25 which are of fixed values (example: 1 and 590 Kilohms, respectively), and the resistance 26 which is chosen to have a value which may be approximately one thousand times that of the getter-layer resistance (i.e. typically about 5 kilohms to 1 megohm). DC excitation of the bridge 23 is impressed across its corners 27 and 28, resulting in bridge-unbalance output from corner terminals 29 and 30, whence such output is coupled to input terminals of an operational amplifier 31, In turn, the operational amplifier output is delivered as excitation for the base of a signalling-control transistor 32 which has a light-emitting-diode (LED) 33 in series with its emitter, the collector and emitter in series with LED being suitably connected with system voltage across the combination. A distinctively-colored visible emission from LED 33 is desired for signalling purposes, and, for that purpose, a green LED or the like may be used to develop a green-colored signalling, G, indicating that the barium layer is functioning as intended and has not been depleted as a useful getter. LED 33 conducts and produces a visible emission only so long as a predetermined minimum voltage appears across it, and that minimum (typically about 3 volts) is assured initially by inserting an appropriate value of resistance for element 26 of the bridge, whereupon the drops across the load resistance 34 (typically about 1.2 kilohms) and other items of the series combination result in desired splitting of the voltage and at least the minimum for LED 33. In parallel with the aforementioned series combination there is disposed a second series combination of a smaller resistance 35, three diodes 36 a, 36 b and 36 c, and a second LED 37, the latter being a red LED of the like to develop a visible red-colored warning signal, R, when stimulated into emissions by a predetermined minimum voltage such as the earlier-mentioned 3 volts. Each of the diodes $36a - 36c$ requires at least a predetermined voltage across it to conduct, and the voltage available to cause LED 37 to conduct and emit light at any time will be affected by what voltage drop exists across the common load resistance 34, the latter being affected by what current is drawn through that resistance as a consequence of the current flow in the first series combination as dictated by transistor 32. As has been said, the green-emitting LED 33 is to be full on when the barium or other getter layer is fresh and of minimum resistance, with the red-emitting LED 37 extinguished. Subsequently, as the getter layer increases in resistance and its further capability of reacting with gases is quite limited, the red-emitting LED 37 is to be excited into a warning emission, with the green-emitting LED 33 remaining on also, as a means for insuring that such a critical warning is distinctive. Still later, when the getter layer resistance is very high and it can be expected that it is not capable of maintaining the vital low reference pressure, the green-emitting LED 33 is to be extinguished and only the red-emitting LED 37 is to provide a visible output signal of the probability that the sensor is no longer reliable as to accuracy.

The foregoing sequencing of signalling is promoted by introducing an adjustable resistance box for the intended bridge arm resistance 26 and adjusting the resistance value until red emissions just being to appear from LED 37. That value may in each instance be a distinctive one, because the getter layer 19 in each different sensor may have a unique value of resistance initially. A fixed resistance 26 is then substituted, with a value about one and one-half times that determined with the aid of the resistance box. Thereafter, as the system is put into use, it will operate with LED 33 emitting a green visible signal so long as the getter layer maintains its original value or values up to about one and one-half times that original value, thereby indicating that the reference-cavity vacuum is of good quality. In that portion of the operating sequence, operational amplifier 31 witnesses an input from bridge 23 which decreases with significant lapse of time, and transistor 32 increases its own voltage drop and causes diminished current to be drawn through load resistance 34 over the same period, resulting in lessened voltage being available to sustain emissions from LED 33 while more becomes available to promote red emissions from warning LED 37. In the next sequence, while barium layer 19 exhibits a yet higher resistance of between about one and one-half times and twice that of its original value, both LED 33 and LED 37 emit simultaneously, and the operator is forewarned that the getter action is nearing the end of its reliablity. Thereafter, when the getter layer resistance exhibits more than about twice its original value, there is insufficient voltage available to LED 33 to sustain its conduction and emissions, although the reverse is then true for LED 37 and the latter emits alone. Voltage tapped at the lower-voltage end of resistance 35 is coupled to the negative input of operational amplifier 31, via resistance 38, and has a desirable counteracting influence with respect to bridge-unbalance outputs, such that both LED's 33 and 37 may stably emit simultaneously at times when they should do so.

Optimum vapor-deposition of the barium layer 19 is achieved through electrical flashing, excitation for which is conveyed through central conductor 14 of unit 13 and through the metallic wall structure 7. As is shown in FIGS. 2 through 4, a strip or ribbon 39 carries getter material which can be heated to produce a vapor of barium or the like which will become deposited on nearby surfaces, and especially across the aforementioned conductive and insulating surfaces of unit 13. That ribbon is connected at its ends with a connector and support member 40 spot-welded to conductor 14 and with the metal shield 41 affixed to wall 7. Preferably, the ribbon 39 is of stainless steel and is dished or boat-like in configuration to direct the released vapor toward the surfaces intended to be coated; shield 41 also aids in insuring that the deposit is properly localized, not only to prevent shorting of capacitance connections within the cavity but to promote an optimum barium resistance layer or film for the improved monitoring which has been described.

The practices and equipment here disclosed may be exploited in apparatus other than absolute-pressure sensors, and for the monitoring of other data. By way of example, the effectiveness or adequacy of a gettering deposit may be sensed in terms of the resistance of the deposited layer, to insure that good gettering or keeping actions will occur thereafter. Porosity, rupture or other conditions indicated by the presence of gas molecules can also be detected, and the deposit of getter material may be by way of induction heating rather than flashing if the structure admits of that practice. Accordingly, it should be understood that the specific embodiments and practices herein described have been presented by way of disclosure rather than limitation, and that various modifications, combinations and substitutions may be affected by those skilled in the art without departure in spirit or scope from this invention in its broad aspects and as set forth in the appended claims.

What we claim as new and desire to secure by Letters Patent of the United States is:

1. Apparatus for monitoring the change in the electrical resistive condition from an initially determined resistive condition of a layer of highly-reactive getter material located at an initially substantially evacuated site which is rendered physically inaccessible by sealing, comprising at least a pair of electrically-isolated electrically-conductive members each having surfaces both within and remote from said site, electrically-insulating material sealed with said members and preserving the electrically-isolated relationship thereof while disposing surface area therebetween at said site, a continuous layer of said getter material deposited upon said surface area and making electrical contacts with said surfaces of both of said conductive members within said site, and electrical measurement means remote from said site electrically coupled with said conductive members and responsive to said change as exhibited by said layer as a result of its reaction with gases present at said site, thereby to provide an external indication of the degree of degradation of the initial evacuation at said site prior to the exhaustion of the getter.

2. Apparatus as set forth in claims 1 wherein said site comprises a sealed and substantially evacuated cavity, wherein said conductive members include at least one feed-through conductor extending through a wall of said cavity and sealed therewith in insulated relationship thereto by said electrically-insulating material, and wherein said electrical measurement means includes an electrical circuit and means coupling electrical resistance exhibited by said layer into said circuit as a part thereof.

3. Apparatus as set forth in claim 2 wherein said circuit includes in another part thereof means exhibiting an electrical property having a value which is in a predetermined relationship to the electrical resistance exhibited by said layer between its said contacts while substantially unreacted with gas molecules, whereby the electrical relationships of said parts characterize the extents of reactions of said layer with gas molecules in said cavity.

4. Apparatus as set forth in claim 3 wherein said layer consists essentially of barium, wherein said cavity comprises the reference cavity of an absolute pressure sensor which includes a measurement cavity exposed to pressures which are to be measured and a deflectable diaphragm separating the two cavities and maintaining a sealed relationship with them, and wherein said electrical measurement means further includes signalling means responsive to said resistance and signalling said extents of said reactions.

5. Apparatus as set forth in claim 3 wherein said electrical measurement means further includes amplifier means responsive to electrical output signals from said circuit related to said resistance, and signalling means responsive to outputs from said amplifier means characterizing the occurrence of a predetermined resistance condition and thereby signalling that said layer is about to lose its capability to react significantly with gas molecules in said cavity.

6. Apparatus as set forth in claim 5 wherein said signalling means is also responsive to outputs from said amplifier means characterizing the occurrence of another resistance condition and thereby signals that said layer has substantially lost its capability to react significantly with gas molecules in said cavity.

7. Apparatus as set forth in claim 6 wherein said signalling means is also responsive to outputs from said amplifier means characterizing that the resistance condition is within a predetermined range and thereby signals that said layer retains the capability to react significantly with gas molecules in said cavity and maintain substantially a predetermined low pressure in said cavity.

8. Apparatus as set forth in claim 7 wherein said signalling means include light-emitting diodes, means connecting one of said diodes to emit responsive to said amplifier outputs characterizing said other predetermined condition, means connecting another of said diodes to emit responsive to said amplifier outputs characterizing that said condition is within said predetermined range, said connecting means also connecting both of said diodes to emit simultaneously responsive to said amplifier outputs characterizing said predetermined condition.

9. Apparatus as set forth in claim 5 wherein said predetermined resistance condition is a resistance of said layer which is of the order of about one and one-half times that which it exhibits when initially deposited.

10. Apparatus for monitoring the extents to which a highly-reactive getter material reacts with gas molecules within a cavity which has been substantially evacuated and sealed, comprising a combined electrical-connector and sensing unit in the form of a coaxial connector sealed with a wall of said cavity and extending therethrough, said unit including a first feed-through conductor and vitreous electrically-insulating material sealed with said conductor and presenting an insulating surface within said cavity, a continuous layer of getter material consisting essentially of barium deposited upon said insulating surface and making electrical contact both with said conductor and with another conductive surface to which low-resistance electrical connection is accessible outside of said cavity, an electrical heating element carrying a barium compound capable of releasing barium vapor when heated, means supporting said element within said cavity in close proximity with said electrically-insulating surface and said conductor for direction of barium vapor thereupon, shield means supported within said cavity in at least partially enclosing relation to said element and physically blocking the passage of barium vapor in at least certain paths away from said element, and means including at least a second feed-through conductor for forcing electrical current through said heating element to occasion release of barium vapor therefrom, whereby electrical resistance of said layer of getter material is exhibited between said conductor and said other conductive surface and characterizes said extents to which said material reacts with gas molecules.

11. The method of monitoring the condition of a highly-reactive getter material at a site rendered physically inaccessible by sealing, which comprises vapor-depositing a thin continuous layer of the getter material at that site atop an electrically-insulating surface and atop at least a pair of conductive members which are spaced apart with the insulating surface therebetween, and electrically detecting and characterizing the electrical resistance exhibited by the deposited layer between the conductive members.

12. The method as set forth in claim 11 wherein the step of vapor-depositing the layer of getter material comprises electrically flashing a quantity of barium-containing material at said site and directing the resulting vapor onto the insulating surface and conductive members to form a continuous layer of barium, and wherein the step of detecting and characterizing the resistance of the layer includes connecting the conductive members into an electrical bridge network with the resistance of the barium layer as an arm thereof and setting the resistance of another arm thereof at a value which is in a predetermined relationship to the value of the layer resistance when initially deposited.

13. The method as set forth in claim 12 which further comprises detecting when a predetermined increase has occurred in the value of resistance of the layer in relation to its value of resistance when initially deposited, and thereupon signalling that the layer of barium is about to lose its capability to react with gas molecules at that site.

14. The method as set forth in claim 13 which further comprises detecting when another predetermined increase has occurred in the value of resistance of the layer in relation to its value of resistance when initially deposited, and thereupon signalling that the layer of barium has substantially lost its capability to react significantly with gas molecules at that site.

15. The method as set forth in claim 14 which further comprises detecting when the value of resistance of the layer is not in excess of a predetermined ratio to its value of resistance when initially deposited, and, in response to said detecting, signalling that the layer of barium retains its capability to react with gas molecules at that site.

16. The method as set forth in claim 13 wherein the setting of resistance of the other arm involves setting that resistance at a value which is of the other of about one and one-half times the lowest value at which resistance in the other arm results in the signalling while the resistance of the layer is about that which it exhibits when initially deposited.

* * * * *